(12) United States Patent
Fischer et al.

(10) Patent No.: US 11,628,791 B2
(45) Date of Patent: Apr. 18, 2023

(54) DRIVER AIRBAG

(71) Applicant: ZF Passive Safety Systems US Inc., Washington, MI (US)

(72) Inventors: Kurt F. Fischer, Rochester, MI (US); Douglas M. Gould, Lake Orion, MI (US); Alexandra E. Schroeder, Lake Orion, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 16/960,140

(22) PCT Filed: Dec. 11, 2018

(86) PCT No.: PCT/US2018/064814
§ 371 (c)(1),
(2) Date: Jul. 6, 2020

(87) PCT Pub. No.: WO2019/135861
PCT Pub. Date: Jul. 11, 2019

(65) Prior Publication Data
US 2021/0122317 A1    Apr. 29, 2021

Related U.S. Application Data

(60) Provisional application No. 62/594,568, filed on Jan. 3, 2018.

(51) Int. Cl.
*B60R 21/205* (2011.01)
*B60R 21/231* (2011.01)
(Continued)

(52) U.S. Cl.
CPC ......... *B60R 21/205* (2013.01); *B60R 21/013* (2013.01); *B60R 21/231* (2013.01);
(Continued)

(58) Field of Classification Search
CPC . B60R 21/205; B60R 21/231; B60R 21/2338; B60R 2021/23382
See application file for complete search history.

(56) References Cited

U.S. PATENT DOCUMENTS 3,801,126 A * 4/1974 Knight, IV ........... B60R 21/205
                                                              280/732
7,748,730 B2 * 7/2010 Kashiwagi ............ B60R 21/206
                                                              280/728.2
(Continued)

FOREIGN PATENT DOCUMENTS

DE    2251493 A1 * 5/1973 ........... B60R 21/231
DE    19860804 A1 * 7/2000 ........... B60R 21/231
(Continued)

*Primary Examiner* — Keith J Frisby
(74) *Attorney, Agent, or Firm* — Tarolli, Sundheim, Covell & Tummino LLP

(57) ABSTRACT

An apparatus (10) for helping to protect an occupant (20) of a front driver seat (22) of a vehicle (12) includes an inflatable vehicle occupant protection device in the form of an airbag (14) that is inflatable from an instrument panel (30) of the vehicle to a position between the instrument panel and the occupant. The airbag (14) has a curved configuration in profile such that the airbag can deploy from a mounting location in the instrument panel (30) toward the vehicle occupant (20), creating a space (86, 130) between the airbag and the instrument panel for receiving a vehicle steering wheel (32), if present.

16 Claims, 4 Drawing Sheets

(51) Int. Cl.
  *B60R 21/2338*  (2011.01)
  *B60R 21/013*  (2006.01)
(52) U.S. Cl.
  CPC .............. *B60R 2021/23169* (2013.01); *B60R 2021/23382* (2013.01)

(56) References Cited

U.S. PATENT DOCUMENTS

| | | | |
|---|---|---|---|
| 9,650,011 B1 * | 5/2017 | Belwafa | B60R 21/233 |
| 9,738,243 B2 * | 8/2017 | Fukawatase | B60R 21/2338 |
| 2005/0230945 A1 | 10/2005 | Watanabe | |
| 2006/0232050 A1 * | 10/2006 | Kumagai | B60R 21/231 |
| | | | 280/730.1 |
| 2006/0261579 A1 * | 11/2006 | Breed | B60R 21/205 |
| | | | 280/729 |
| 2018/0043852 A1 * | 2/2018 | Fischer | B60R 21/233 |
| 2018/0162312 A1 * | 6/2018 | Faruque | B60R 21/233 |
| 2019/0161044 A1 * | 5/2019 | Schneider | B60R 21/203 |

FOREIGN PATENT DOCUMENTS

| | | | | |
|---|---|---|---|---|
| DE | 202006001826 | | 5/2006 | |
| DE | 102012011664 | | 12/2012 | |
| DE | 102012023928 | A1 * | 6/2014 | ........... B60R 21/231 |
| JP | 2011-037398 | A * | 2/2011 | |
| JP | 2011037398 | | 2/2011 | |

\* cited by examiner

DRIVER AIRBAG

RELATED APPLICATION

This application corresponds to PCT/US2018/064814, filed Dec. 11, 2018, which claims benefit of U.S. Provisional application 62/594,568, filed Jan. 3, 2018, the subject matter of which is incorporated herein by reference in its entirety.

RELATED APPLICATIONS

This application claims the benefit of U.S. Provisional Application Ser. No. 62/594,568, filed Jan. 3, 2018.

FIELD OF THE INVENTION

The present invention relates to an apparatus for helping to protect an occupant of a vehicle. More particularly, the present invention relates to an airbag for helping to protect an occupant of a driver seat of a vehicle.

BACKGROUND OF THE INVENTION

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags can be driver airbags or passenger airbags. When inflated, the driver and passenger airbags help protect the occupant from impacts with parts of the vehicle such as the instrument panel and/or a steering wheel of the vehicle.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated position. The airbag cover opens as a result of forces exerted on the cover by the inflating driver airbag.

Because driver airbags are steering wheel mounted, and because the rotational position of the steering wheel at the time of airbag deployment cannot be predicted, driver airbags are typically round in shape. Additionally, since the vehicle driver is likely to have his or her hands on (i.e., grasping) the steering wheel at the time of airbag deployment, the size (i.e., diameter, thickness, etc.) of the driver airbag can be limited so as to avoid driver injury.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated position. The airbag door opens as a result of forces exerted on the door by the inflating airbag. Because passenger airbags are not tasked with protecting vehicle operators, the size and shape of the airbag is not limited by the requirements present for a driver airbag. Passenger airbags can therefore provide broad frontal coverage for the passenger.

SUMMARY OF THE INVENTION

The present invention relates to an apparatus for helping to protect an occupant of a front driver seat of a vehicle. The apparatus includes an inflatable vehicle occupant protection device in the form of an airbag that is inflatable from an instrument panel of the vehicle to a position between the instrument panel and the occupant. The airbag has a curved configuration in profile such that the airbag can deploy from a mounting location in the instrument panel toward the vehicle occupant, creating a space between the airbag and the instrument panel for receiving a vehicle steering wheel, if present.

According to one aspect, alone or in combination with any other aspect, the airbag can be configured for mounting in the instrument panel behind a steering wheel position as viewed from the perspective of the driver seat. The airbag can also be configured to deploy upward in the vehicle toward a vehicle roof, over the top of the steering wheel if present, and rearward in the vehicle toward the driver seat.

According to another aspect, alone or in combination with any other aspect, the curved configuration of the airbag can define a recess configured to receive the steering wheel if present.

According to another aspect, alone or in combination with any other aspect, the airbag can be configured to curve over the top of the steering wheel if present and extend downward to below the lower extent of the steering wheel if present.

According to another aspect, alone or in combination with any other aspect, the airbag can be configured to curve over the top of the steering wheel if present and extend downward to adjacent or near the legs of the occupant.

According to another aspect, alone or in combination with any other aspect, the airbag can include a pair of opposite side panels and outer panels that extend between the side panels and is connected to the side panels along their respective peripheries.

According to another aspect, alone or in combination with any other aspect, the airbag can also include at least one inner panel positioned between the side panels inside the inflatable volume of the airbag, wherein the at least one inner panel helps to define an inflatable longitudinal chamber of the airbag.

According to another aspect, alone or in combination with any other aspect, the at least one inner panel can serve as a tether that interconnects a front portion of the outer panel to a rear portion of the outer panel.

According to another aspect, alone or in combination with any other aspect, the at least one inner panel can include at least one opening that provides fluid communication between the chambers.

According to another aspect, alone or in combination with any other aspect, the curved configuration can include an inverted U-shaped configuration.

According to another aspect, alone or in combination with any other aspect, the airbag can include an inflatable front portion proximate the occupant, an inflatable rear portion proximate the instrument panel, and an inflatable top portion that extends between the front and rear portions, wherein the front portion is configured to be positioned between the steering wheel if present and the occupant, the rear portion is configured to be positioned between the steering wheel if present and the instrument panel, and the top portion is configured to extend from adjacent the windshield to adjacent the occupant.

According to another aspect, alone or in combination with any other aspect, the airbag can include lateral chambers configured to extend rearward in the vehicle toward the occupant beyond the extent of central chambers positioned between the lateral chambers.

According to another aspect, alone or in combination with any other aspect, the lateral chambers and central chambers can be configured to define a pocket configured to receive an occupant moving obliquely into engagement with the airbag.

According to another aspect, alone or in combination with any other aspect, the apparatus can include a housing configured to be mounted in an instrument panel of the vehicle behind the steering wheel if present, wherein the airbag is mounted in the housing.

An airbag module can include the apparatus according to any of the aspects set forth herein, and an inflator for inflating the airbag. A vehicle safety system can include the airbag module, a sensor for sensing the occurrence of an event for which occupant protection is desired and providing a signal indicative of the sensed event, and a controller operative to actuate the inflator to inflate and deploy the airbag in response to receiving the signal from the sensor.

According to another aspect, alone or in combination with any other aspect, a method for helping to protect an occupant of a driver seat of a vehicle can include providing an airbag having a curved configuration, mounting the airbag in the vehicle behind a steering wheel if present, and deploying the airbag in response to an event for which occupant protection is desired. The method can also include configuring the airbag so that it deploys upward and rearward over the steering wheel if present and downward in front of the steering wheel if present between the steering wheel if present and the occupant.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

Figure 1:
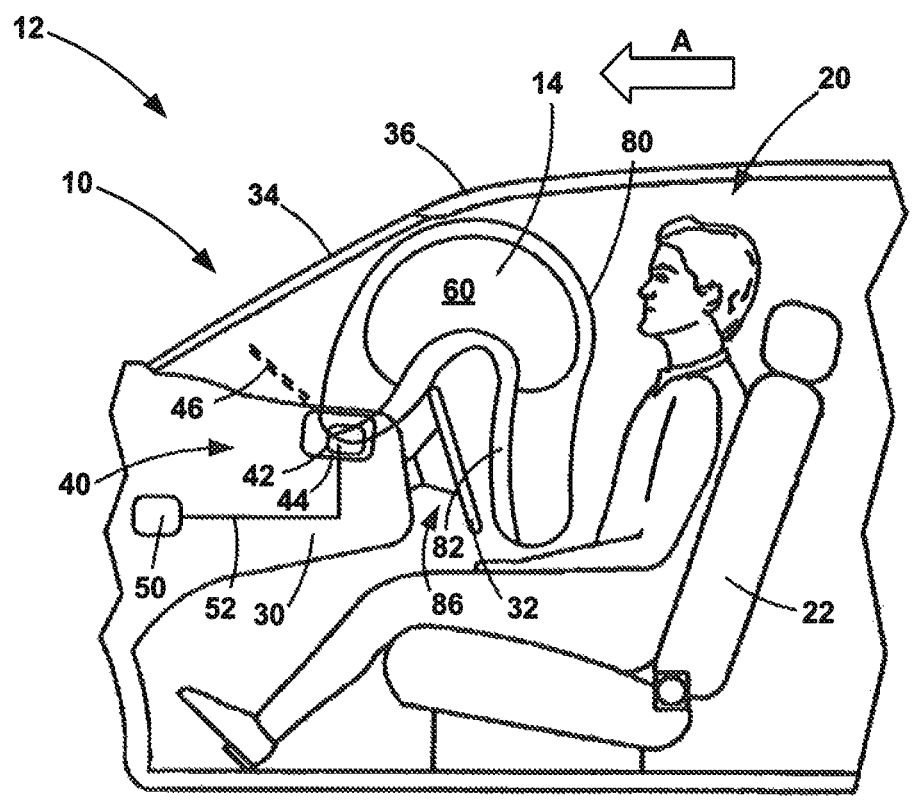
FIG. 1 is a schematic illustration of an apparatus for helping to protect an occupant of a vehicle in accordance with an example configuration.

The present invention relates to an apparatus for helping to protect an occupant of a vehicle. More particularly, the present invention relates to an airbag inflatable between a reaction surface of a vehicle and an occupant in a vehicle seat. Referring to FIG. 1, an apparatus 10 for helping to protect an occupant 20 of a vehicle 12 includes an inflatable vehicle occupant protection device 14 in the form of an airbag 14. In the embodiment illustrated in FIG. 1, the airbag 14 is a driver frontal airbag for helping to protect an occupant 20 of a driver seat 22 of the vehicle 12. The driver seat 22 is positioned so that the seated occupant 20 faces an instrument panel 30, steering wheel 32, and windshield 34 of the vehicle 12.

The airbag 14 can be part of an airbag module 40 that includes an inflator 42 and a housing 44. In the example configuration of FIG. 1, the module 40 is mounted to or within the instrument panel 30. The module 40 could, however, be mounted in alternative locations. The airbag 14 has a stored condition in which the airbag is folded and placed in a stored condition within the housing 44.

A module door 46, shown in dashed lines in an open condition in FIG. 1, forms a cover for the module 40 and helps enclose the airbag 14 in the stored condition in the housing 44. The door is movable to an opened condition that uncovers an opening in the housing 44 through which the airbag 14 can be deployed from the stored condition to an inflated or deployed condition. The door can, for example, be connected to the housing 44 by means (not shown), such as a plastic hinge portion, a strap or a tether.

The inflator 42 is actuatable to provide inflation fluid to an inflatable volume 60 of the airbag 14 to deploy the airbag to the inflated condition. The inflator 42 can be of any known type, such as stored gas, solid propellant, augmented or hybrid. The apparatus 10 includes a sensor/controller 50 for sensing an event for which inflation of the airbag 14 is desired, such as a collision. The inflator 42 is operatively connected to the sensor/controller 50 via lead wires 52.

The airbag 14 can be constructed of any suitable material, such as nylon (e.g., woven nylon 6-6 yarns), and can be constructed in any suitable manner. For example, the airbag 14 can include one or more pieces or panels of material. If more than one piece or panel is used, the pieces or panels can be interconnected by known means, such as stitching, ultrasonic welding, heat bonding or adhesives, to form the airbag 14. The airbag 14 can be uncoated, coated with a material, such as a gas impermeable urethane or laminated with a material, such as a gas impermeable film. The airbag 14 thus can have a gas-tight or substantially gas-tight construction. Those skilled in the art will appreciate that alternative materials, such as polyester yarn, and alternative coatings, such as silicone, can also be used to construct the airbag 14.

In the illustrated embodiment, the airbag 14 is constructed of one or more panels of material interconnected to define the inflatable volume 60 of the airbag Upon sensing the occurrence of an event for which inflation of the airbag 14 is desired, such as a vehicle collision, the sensor/controller 50 provides a signal to the inflator 42 via the lead wires 52. Upon receiving the signal from the sensor/controller 50, the inflator 42 is actuated and provides inflation fluid to the inflatable volume 60 of the airbag 14 in a known manner. The inflating airbag 14 exerts a force on the module door 46, which opens and releases the airbag to inflate and deploy from the stored condition to the deployed condition, illustrated in FIG. 1. The airbag 14, when deployed, helps protect the vehicle occupant 20 from impacts with parts of the vehicle 12, such as impacts with the steering wheel 32, by helping to absorb the force of impact placed on the airbag by the occupant.

Driver airbags are generally mounted in the steering wheel. So when the steering wheel turns, the airbag turns with it. This forces the shape of the traditional driver frontal airbag to be symmetrical in order to keep the presentation of the bag to the occupant the same regardless of the wheel position. As shown in FIG. 1, however, the driver frontal airbag 14 is instrument panel 30 mounted and configured such that, when deployed, the airbag extends over and around the steering wheel 32. The airbag 14 inflates and deploys upward toward the vehicle roof 36, over the top of the steering wheel 32, and downward in front of the steering wheel. The airbag 14 has a generally inverted, U-shaped configuration that achieves this function, placing a portion of the airbag between the occupant 20 and the steering wheel 32. The steering wheel 32 thus acts as a reaction surface for the airbag 14 in the manner of traditional steering wheel mounted airbags.

The mounting location for the airbag 14 on the instrument panel 32 can vary. In one particular implementation, shown below FIG. 1, the mounting location can be between the steering wheel 32 and the windshield 34. In other words the steering wheel is located between the occupant and the instrument panel 30 mounting location of the airbag 14. The mounting location can be centered in front of the occupant as shown or offset, i.e., to either side of the steering wheel.

The airbag 14, having a non-steering wheel mounting location removes the connection between the steering wheel rotational position and the orientation of the airbag. Because the orientation of the airbag 14 is not tied to the steering wheel 32 position, the airbag no longer is confined to a uniform, symmetrical shape, centered on the steering wheel axis of rotation, such as the overall round shape/configuration that is typical of steering wheel mounted airbags. The inverted U-shape of the airbag 14 creates a recess or space 86 for accommodating the steering wheel 32, if present.

Accordingly, the instrument panel 30 mounted driver frontal airbag 14 can have a shape configured for optimal occupant protection without being restricted to a uniform, symmetrical, axially centered steering wheel mounting location. The airbag 14 can, for example, have an increased vertical extent in the vehicle, such as from adjacent or near the vehicle roof 36 down to adjacent or near the occupant's hips/legs and/or the surface of a vehicle seat bottom. The airbag 14 can extend downward to or beyond the lower extent of the steering wheel 32 and can cover the steering wheel. Additionally, the lateral extents of the airbag 14 can be asymmetrical and optimized to account for a wider variety of crash conditions, such as offset and/or oblique crashes. An example configuration for the airbag shown in FIG. 1 is illustrated in FIGS. 2-4.

Figure 2:
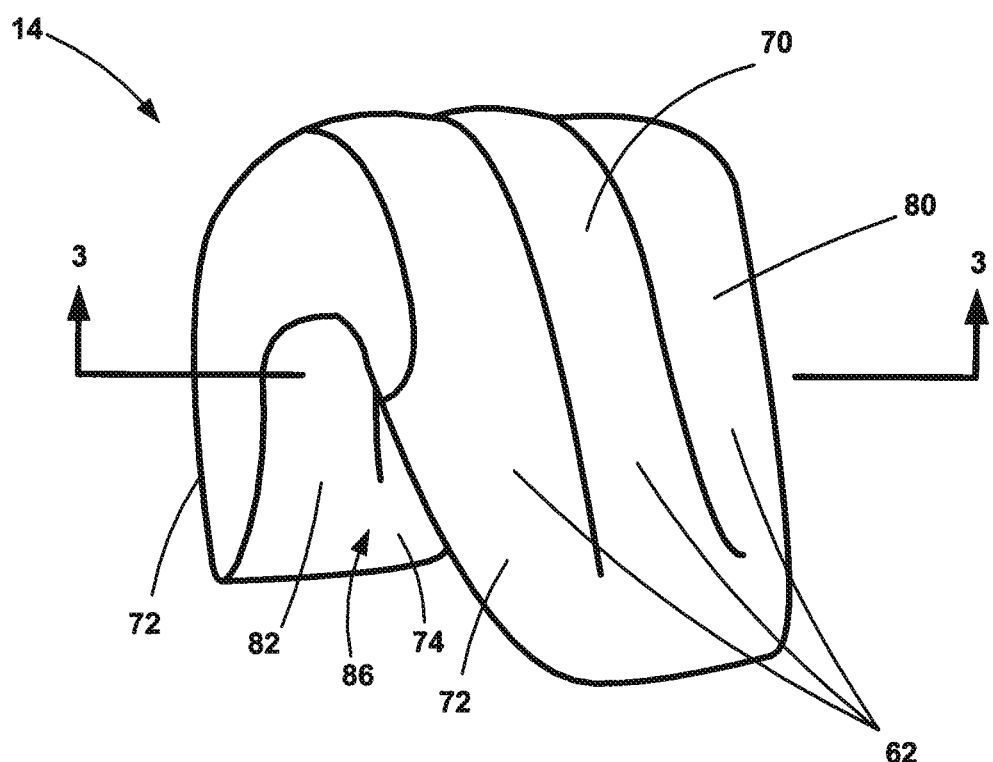
FIG. 2 is a perspective view of a portion of the apparatus of FIG. 1.
Figure 3:
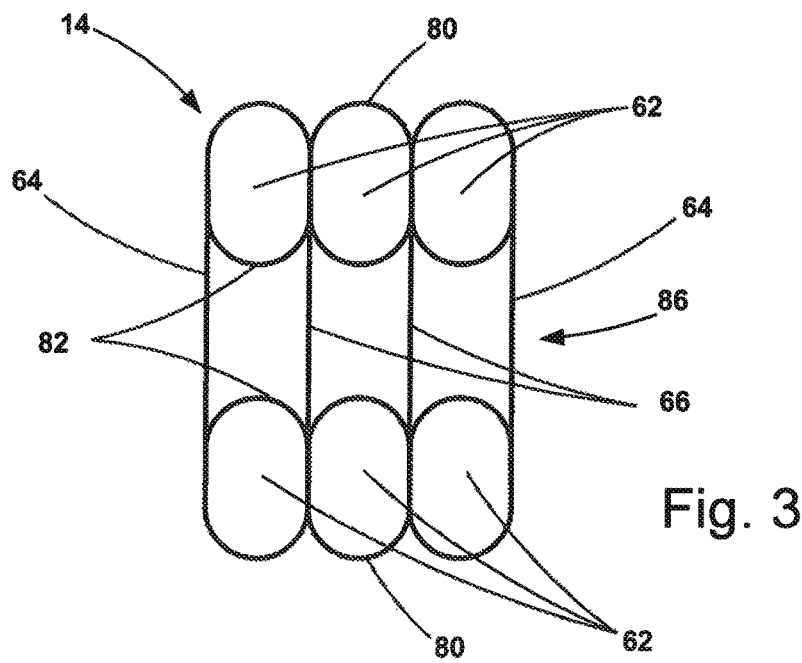
FIG. 3 is a sectional view taken generally along line 3-3 in FIG. 2.
Figure 4:
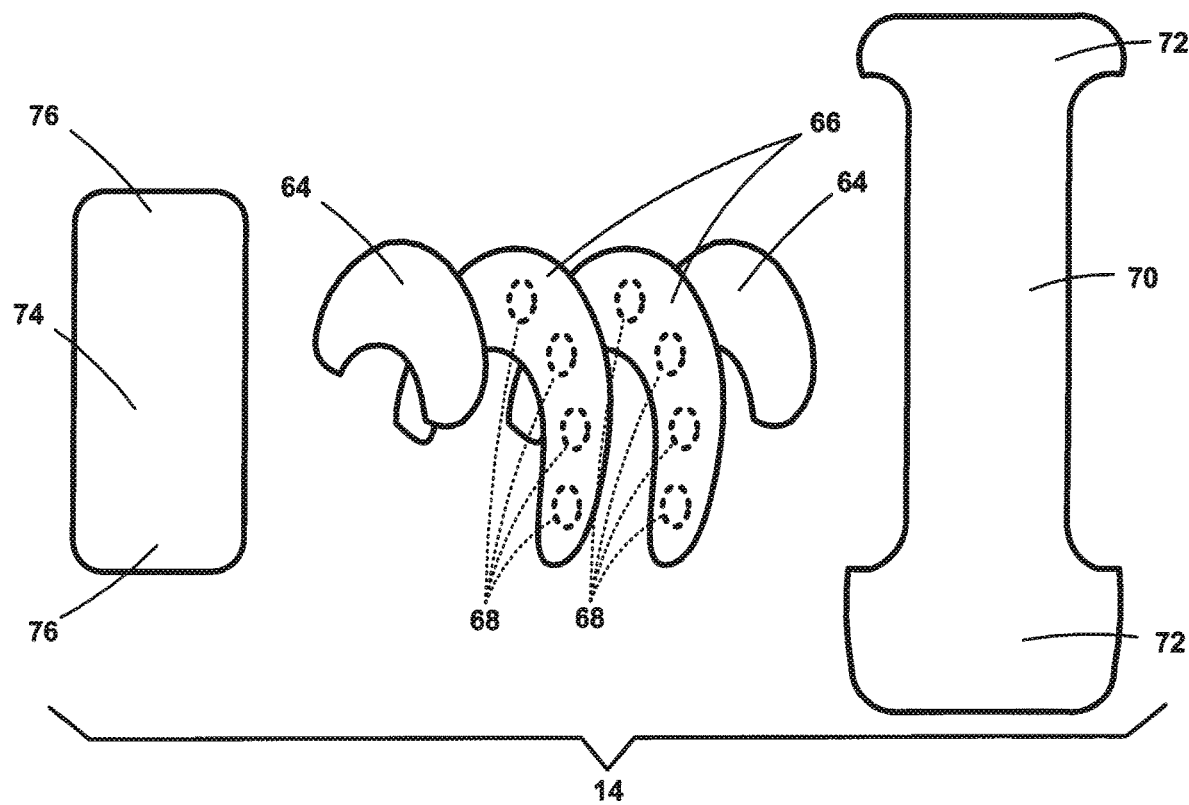
FIG. 4 illustrates the components of the portion of the apparatus of FIGS. 2 and 3.

As shown in FIGS. 2-4, the airbag 14 has a curved configuration and includes curved chambers 62. In the embodiment of FIGS. 2-4, the airbag 14 includes three chambers 62. The airbag 14 could, however, have a greater number of chambers 62 or fewer chambers. In one configuration, the chambers 62 are formed through the use of curved panels that follow the general curved configuration of the airbag 14. This is shown in FIG. 4. As shown in FIG. 4, there are four curved panels that form the three chambers 62 of the airbag 14. The curved panels include two panels that form outer side panels 64 of the airbag 14 and two panels that form inner panels 66 of the airbag. The side panels 64 and inner panels 66 are spaced apart the width of the chambers 62 and connected to a front panel 70 and a rear panel 74, which help define the width of the airbag 14.

As shown in FIG. 4, the front panel 70 has one or more widened portions 72 that help control the width of the airbag 14. The side panels 64 are connected to the front panel 70 along the narrow portion of the front panel defined between the widened portions 72. The inner panels 66 are also connected to the front panel 70 at spaced locations between the side panels 64. The side panels 64 and inner panels 66 are similarly connected to the rear panel 74, with the side panels being connected to edge portions of the rear panel and the inner panels being connected to the rear panel at spaced locations between the edges. Opposite ends 76 of the rear panel 74 are connected to respective widened portions 72 of the front panel 70.

The front panel 70 helps define an outer surface 80 of the airbag 14 that extends along the length of the inverted U-shape of the airbag 14. The outer surface 80 has a portion that faces the occupant 20, a portion that faces the windshield 34, and a portion that faces the vehicle roof 36. The rear panel 74 helps define a rear surface 82 of the airbag 14, which extends along the inverted U-shaped surface that extends around the steering wheel 32. The inner panels 66 define the inner walls of the chambers 62 and also act as tethers that extend in the fore-aft direction and maintain the spacing of the front and rear panels 70, 74. Through the curved configurations of the side panels 64 and inner panels 66, the inflated thickness and curved shape of the airbag 14 is defined and maintained. It is not necessary that the chambers 62 be isolated from each other. In fact, the inner two curved panels 66 can include openings 68 (shown in dashed lines in FIG. 4) that can permit fluid communication between the chambers 62.

The shape and configuration of the airbag 14 and the chambers 62 can be tailored by the configuration of the side panels 64 and inner panels 66. Additionally, the chambers 62 can be configured to have desired pressurization characteristics through the configuration of the openings 68 in the inner panels 66. By controlling the configuration and/or volume of the chambers 62 and the rates at which they are inflated and pressurized, the requisite size of the inflator 42 can be controlled. Controlling the volume(s) of the chambers 62 can also control the pressurization and inflated stiffness of the chambers to meet desired performance criterion.

Figure 5:
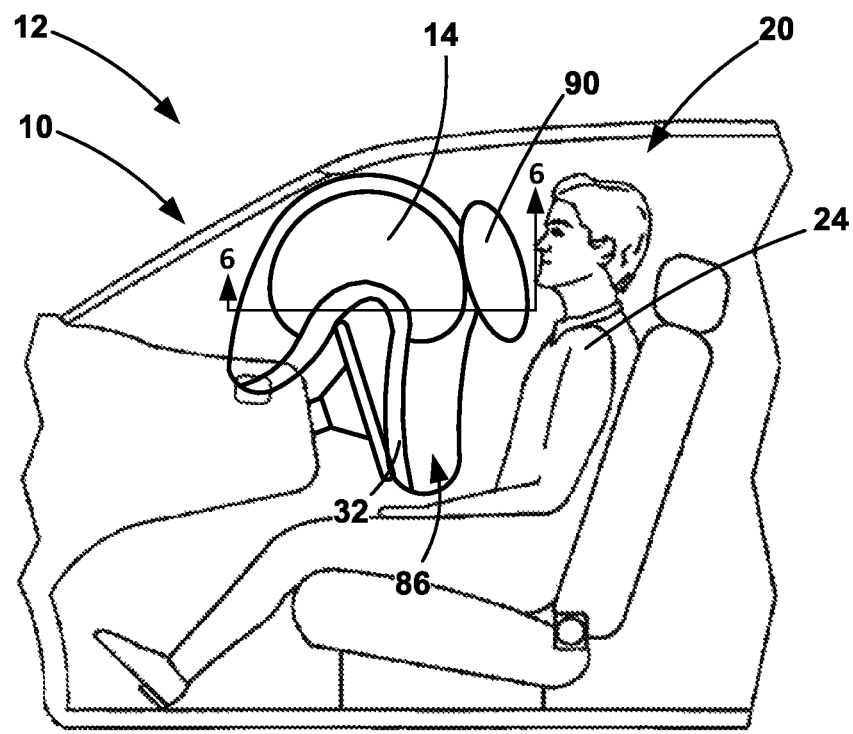
FIG. 5 is a schematic illustration of an apparatus for helping to protect an occupant of a vehicle in accordance with another example configuration.
Figure 6:
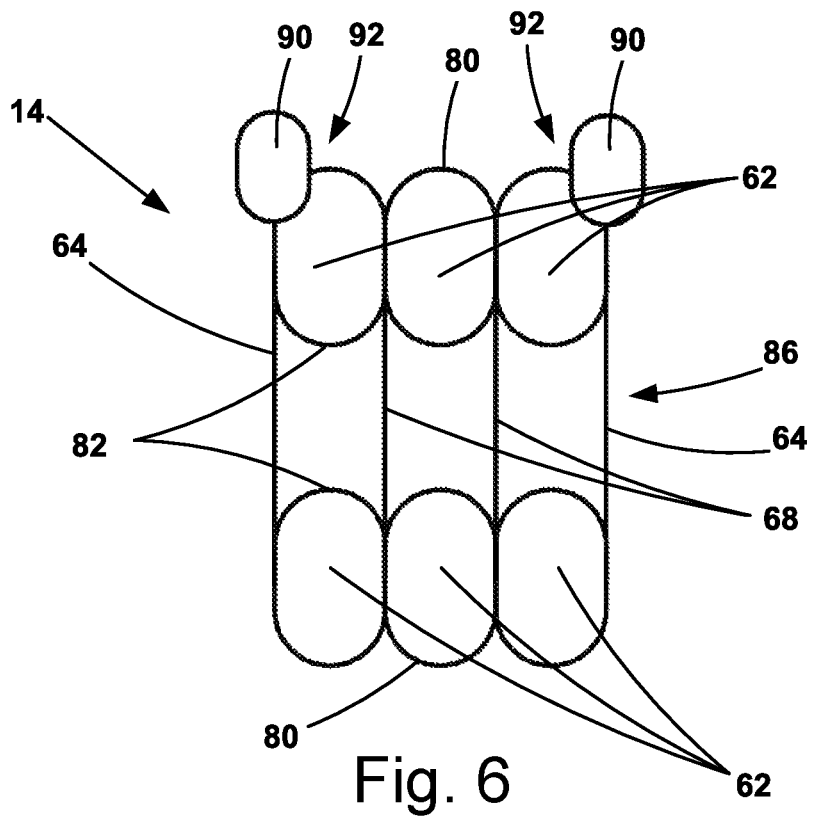
FIG. 6 is a sectional view taken generally along line 6-6 in FIG. 5.

Eliminating the connection of the airbag 14 from the steering wheel 32 also can allow for the addition of chambers to the airbag or changing the extent of coverage afforded by the airbag because the airbag no longer is required to rotate with the steering wheel 32. For example, as shown in FIGS. 5 and 6, the airbag 14 can include additional inflatable features, such as lateral chambers 90, that can help protect the occupant 20 in the event of a collision, such as an offset or oblique collision, which could cause the occupant to travel obliquely toward the airbag. In this event, the lateral chambers 90, in combination with the adjacent chambers 62, form a pocket 92 for receiving the occupant 20. The lateral chambers 90 are positioned substantially above the occupant's shoulders 24 (see FIG. 5) and extend rearward, i.e., toward the occupant 20, beyond the rearward extent of the primary chambers 62 and thus help prevent the occupant from moving laterally around the airbag 14.

Additionally or alternatively, the airbag 14 can have a wider extent in the vehicle 12 in front of the driver/occupant 20 and can be curved or otherwise shaped to receive the occupant. This can be seen, for example, from the airbag 20 of FIG. 6 in which the chambers 62, 90 are configured in a concave arrangement or curvature. Because the airbag 14 is not steering wheel mounted, its shape can be large and/or irregular. The airbag 14 can include additional chambers to achieve the desired configuration and coverage.

Figure 7:
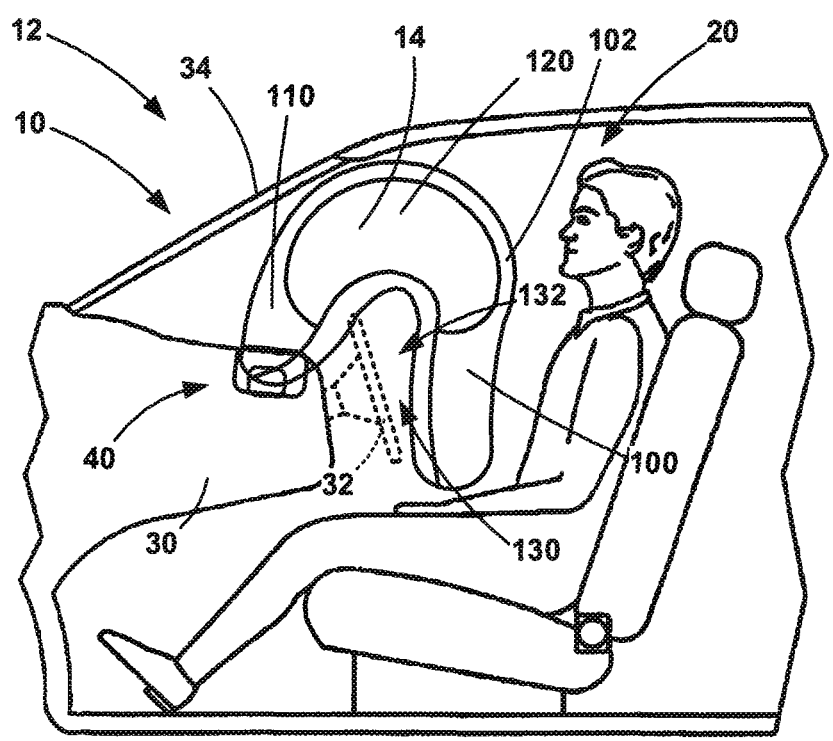
FIG. 7 is a schematic illustration of an apparatus for helping to protect an occupant of a vehicle in accordance with another example configuration.

Furthermore, with the introduction of autonomous driving, the vehicle 12 may not include a steering wheel, or the steering wheel may be retractable or collapsible. This is shown in FIG. 7, where the steering wheel 32 is shown in dashed lines. In this instance, the airbag 14 can deploy around the steering wheel 32 if present, and can still afford occupant protection when the steering wheel is not present/ retracted. In either situation, the airbag 14 deploys and is positioned between the passenger 20 and the instrument panel 30, windshield 34, and steering wheel 32, if present.

It will therefore be appreciated that the airbag 14 does not depend on the presence of the steering wheel 32. The airbag 14 is configured to deploy around the steering wheel position (indicated generally at 132), regardless of whether the steering wheel 32 is present. The steering wheel position 132 can be represented by the dashed line figure of the steering wheel 32, which is indicative of the position of the steering wheel, if present. When the steering wheel 32 is present, it can serve as a reaction surface for the airbag 14. When the steering wheel 32 is not present, the instrument panel 30 and/or windshield 34 can serve as a reaction surface for the airbag 14. This is illustrated in FIG. 7.

In the configuration of FIG. 7, the generally inverted, U-shaped configuration of the airbag 14 is advantageous in that it can provide occupant protection regardless of whether the steering wheel 32 is present. The inflated airbag 14 includes a front portion 100 proximate or adjacent to the occupant 20 and a rear portion 110 proximate or adjacent the instrument panel 30 and windshield 34.

In the deployed condition, the front portion 100 includes a front panel or surface 102 presented towards the occupant 20. The rear portion 110 is connected to the instrument panel 30 via its connection to the module 40. The front and rear portions 100, 110 are spaced from each other by a distance or depth extending in a fore-aft direction of the vehicle 12, and are interconnected at a top portion 120. The front portion 100, rear portion 110, and top portion 120 help define the space or recess 86 bounded by the airbag 14. When the airbag 14 is deployed, the recess 130 coincides with or covers the steering wheel 32, if present (i.e., the steering wheel position 132) in the space between the airbag and the instrument panel 30.

When the airbag 14 deploys in the presence of a steering wheel 32, it deploys around the steering wheel, which becomes positioned in the recess 130. In this instance, the front portion 100 helps protect the occupant 20 from impacts with the steering wheel 32 and to absorb occupant impact forces and provide the desired "ride down" effect. Additionally, the upper portion 120 extends the depth of the airbag 14, from front to rear, with the upper rear portion 110 being positioned in the space between the instrument panel 30 and windshield 34. The upper portion 120 can thus engage the windshield 34 and/or the instrument panel 30, which can serve as a reaction surface for the airbag. Because of this, when the airbag 14 deploys when the steering wheel is not present, the upper portion 120 can still afford the desired degree of occupant protection. The front portion 100 can move into engagement with the instrument panel 30 and provide further occupant protection.

Advantageously, it can be seen that the invention provides a method for helping to protect an occupant 20 of a driver seat 22 of a vehicle 12. The method includes providing an airbag having a curved configuration, mounting the airbag in the vehicle behind a steering wheel 32, and deploying the airbag in response to an event for which occupant protection is desired. The method also includes configuring the airbag so that it deploys upward and rearward over the steering wheel and downward in front of the steering wheel between the steering wheel and the occupant.

From the above description of the invention, those skilled in the art will perceive improvements, changes and modifications. Such improvements, changes and modifications within the skill of the art are intended to be covered by the appended claims.

We claim:

1. An apparatus for helping to protect an occupant of a front driver seat of a vehicle, comprising an inflatable vehicle occupant protection device in the form of an airbag that is inflatable from an instrument panel of the vehicle to a position between the instrument panel and the occupant, the airbag having a curved configuration in profile such that the airbag can deploy from a mounting location in the instrument panel toward the vehicle occupant, creating a space between the airbag and the instrument panel for receiving a vehicle steering wheel, if present, wherein the airbag comprises one or more central chambers that extend the length of the airbag from top to bottom, and wherein the airbag comprises lateral chambers on opposite sides of the one or more central chambers configured to extend rearward in the vehicle toward the occupant beyond the extent of the one or more central chambers, the lateral chambers being positioned substantially above the occupant's shoulders and adjacent an area of the one or more central chambers configured to receive the occupant's head; wherein the airbag comprises:

a front panel having opposite ends that are widened with respect to the remainder of the front panel;

a rear panel having opposite ends connected to the opposite ends of the front panel to form a loop; and side panels having respective peripheries connected to the looped front and rear panels to define an inflatable volume;

wherein the side panels have a curved configuration that causes the front and rear panels to assume the curved configuration of the airbag, and wherein the panels are configured and arranged so that a front portion of the airbag that faces the occupant has a width that is tapered from wide to narrow as the front portion extends downward from adjacent a top portion of the airbag.

2. The apparatus recited in claim 1, further comprising at least one inner panel that is positioned in the inflatable volume of the airbag and has a periphery connected to the looped front and rear panels, wherein the at least one inner panel has a curved configuration that follows the curved configuration of the side panels.

3. The apparatus recited in claim 1, wherein the airbag is configured for mounting in the instrument panel behind a steering wheel position as viewed from the perspective of the driver seat, and wherein the airbag is configured to deploy upward in the vehicle toward a vehicle roof, over the top of the steering wheel if present, and rearward in the vehicle toward the driver seat.

4. The apparatus recited in claim 1, wherein the curved configuration of the airbag defines a recess configured to receive the steering wheel if present.

5. The apparatus recited in claim 1, wherein the airbag is configured to curve over the top of the steering wheel if present and extend downward to below the lower extent of the steering wheel if present.

6. The apparatus recited in claim 1, wherein the airbag is configured to curve over the top of the steering wheel if present and extend downward to adjacent or near the legs of the occupant.

7. The apparatus recited in claim 6, wherein the airbag further comprises at least one inner panel positioned between the side panels inside the inflatable volume of the airbag, wherein the at least one inner panel helps to define at the least one central chamber of the airbag.

8. The apparatus recited in claim 7, wherein the at least one inner panel serves as a tether that interconnects a front portion of an outer panel to a rear portion of the outer panel.

9. The apparatus recited in claim 7, wherein the at least one central chamber comprises a plurality of central chambers, and wherein the at least one inner panel includes at least one opening that provides fluid communication between the plurality of central chambers.

10. The apparatus recited in claim 1, wherein the curved configuration comprises an inverted U-shaped configuration.

11. The apparatus recited in claim 10, wherein the airbag comprises an inflatable front portion proximate the occupant, an inflatable rear portion proximate the instrument panel, and an inflatable top portion that extends between the front and rear portions, wherein the front portion is configured to be positioned between the steering wheel if present and the occupant, the rear portion is configured to be positioned between the steering wheel if present and the instrument panel, and the top portion is configured to extend from adjacent a windshield to adjacent the occupant.

12. The apparatus recited in claim 1, wherein the lateral chambers and the one or more central chambers are configured to define a pocket configured to receive an occupant moving obliquely into engagement with the airbag.

13. The apparatus recited in claim 1, further comprising a housing configured to be mounted in the instrument panel of the vehicle behind the steering wheel if present, wherein the airbag is mounted in the housing.

14. An airbag module comprising the apparatus recited in claim 1 and an inflator for inflating the airbag.

15. A vehicle safety system comprising the airbag module of claim 14, a sensor for sensing the occurrence of an event for which occupant protection is desired and providing a signal indicative of the sensed event, and a controller operative to actuate the inflator to inflate and deploy the airbag in response to receiving the signal from the sensor.

16. The apparatus recited in claim 1, wherein the lateral chambers extend laterally beyond the width of the one or more central chambers and rearward toward the occupant beyond the rearward extent of the one or more central chambers.

* * * * *